United States Patent
Yoon

(10) Patent No.: US 8,148,882 B2
(45) Date of Patent: Apr. 3, 2012

(54) SPINDLE MOTOR

(75) Inventor: Ho Eop Yoon, Gyeonggi-do (KR)

(73) Assignee: LG Innotek Co., Ltd., Seoul (KR)

(*) Notice: Subject to any disclaimer, the term of this patent is extended or adjusted under 35 U.S.C. 154(b) by 301 days.

(21) Appl. No.: 12/628,701

(22) Filed: Dec. 1, 2009

(65) Prior Publication Data

US 2010/0133960 A1 Jun. 3, 2010

(30) Foreign Application Priority Data

Dec. 3, 2008 (KR) .................. 10-2008-0121908

(51) Int. Cl.
*H02K 5/16* (2006.01)
(52) U.S. Cl. ................................. 310/425; 310/67 R
(58) Field of Classification Search ........... 310/418–429, 310/67 R
See application file for complete search history.

(56) References Cited

U.S. PATENT DOCUMENTS

| | | | |
|---|---|---|---|
| 7,550,884 B2 * | 6/2009 | Nomura et al. | 310/67 R |
| 7,687,946 B2 * | 3/2010 | Kim | 310/67 R |
| 7,745,968 B2 * | 6/2010 | Kodama et al. | 310/90 |
| 7,816,831 B2 * | 10/2010 | Kim | 310/156.26 |
| 7,830,054 B2 * | 11/2010 | Lee | 310/90 |
| 7,876,005 B2 * | 1/2011 | Ichizaki | 310/67 R |
| 7,913,269 B2 * | 3/2011 | Takaki et al. | 720/707 |
| 7,915,774 B2 * | 3/2011 | Lee | 310/90 |
| 7,932,654 B2 * | 4/2011 | Smirnov et al. | 310/90 |
| 2010/0289385 A1 * | 11/2010 | Smirnov et al. | 310/425 |

* cited by examiner

*Primary Examiner* — Thanh Lam
(74) *Attorney, Agent, or Firm* — Saliwanchik, Lloyd & Eisenschenk

(57) ABSTRACT

A spindle motor is disclosed, wherein the spindle motor is formed at an outer periphery of a first protruder of a bearing housing having a gap relative to the inner periphery of the coupling hole of a base with a guide portion contacting an inner periphery of a coupling hole, whereby, the bearing housing is not moved on the base by the guide portion, and whereby the bearing housing is always coupled to a predetermined area of the base, such that when the base assembled with parts is coupled to the product, the parts are always positioned at a predetermined area of the product, thereby improving product reliability.

13 Claims, 4 Drawing Sheets

SPINDLE MOTOR

CROSS-REFERENCE TO RELATED APPLICATION

This application claims the benefit under 35 U.S.C. §119 of Korean Application No. 10-2008-0121908, filed Dec. 3, 2008, which is hereby incorporated by reference in its entirety.

BACKGROUND

The present disclosure relates to a spindle motor. A spindle motor performs the function of rotating a disk to enable an optical pickup which linearly reciprocates in an optical disk drive (ODD) to read data recorded on the disk.

In general, a spindle motor is installed with a rotation shaft and a bearing supporting the rotation shaft. The bearing is inserted into a bearing housing, and the bearing housing is fixedly installed at a base of an optical device or a motor bracket.

BRIEF SUMMARY

An object of the present disclosure is to provide a spindle motor capable of coupling a bearing housing at a predetermined area of a base to thereby enhance reliability of the spindle motor.

According to an aspect of the present disclosure, the object described above is achieved by a spindle motor which comprises: a base on which a coupling hole is formed; a bearing housing having a first protruder inserted into the coupling hole through caulking and vertically installed on the base; a bearing fixed inside the bearing housing; a rotation shaft supportively and rotatably installed into the bearing; a rotor coupled to the rotation shaft to simultaneously rotate with the rotation shaft; and a stator disposed around the bearing housing to rotate the rotor, wherein the first protruder is formed at an outer periphery thereof with a guide portion that contacts an inner periphery of the coupling hole.

BRIEF DESCRIPTION OF DRAWINGS

FIG. 1b is an enlarged view of "A" of FIG. 1a.

DETAILED DESCRIPTION

Figure 1A:
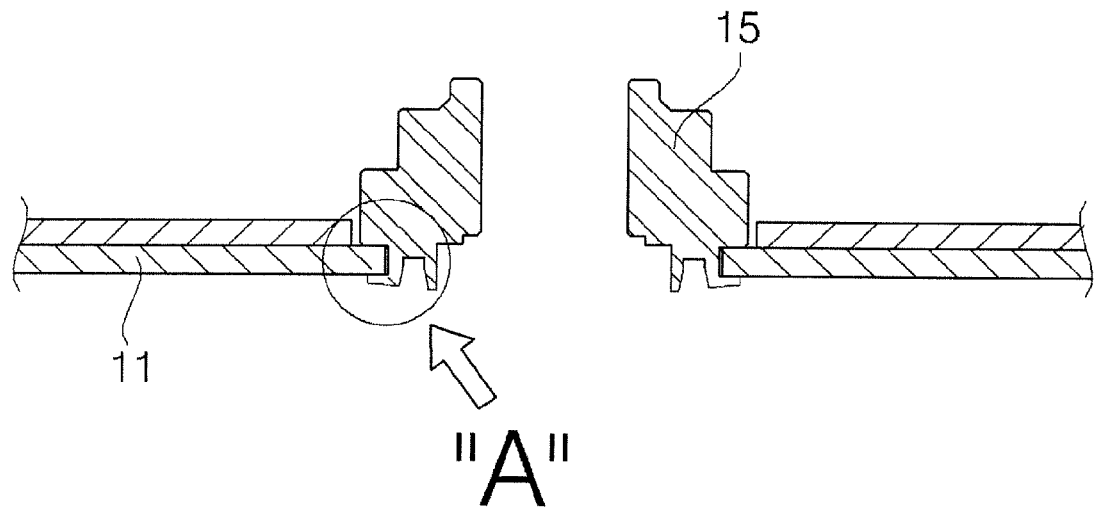
FIG. 1a is a cross-sectional view of essential parts of a spindle motor as an imaginary exemplary embodiment for comparing with the present disclosure.
Figure 1B:
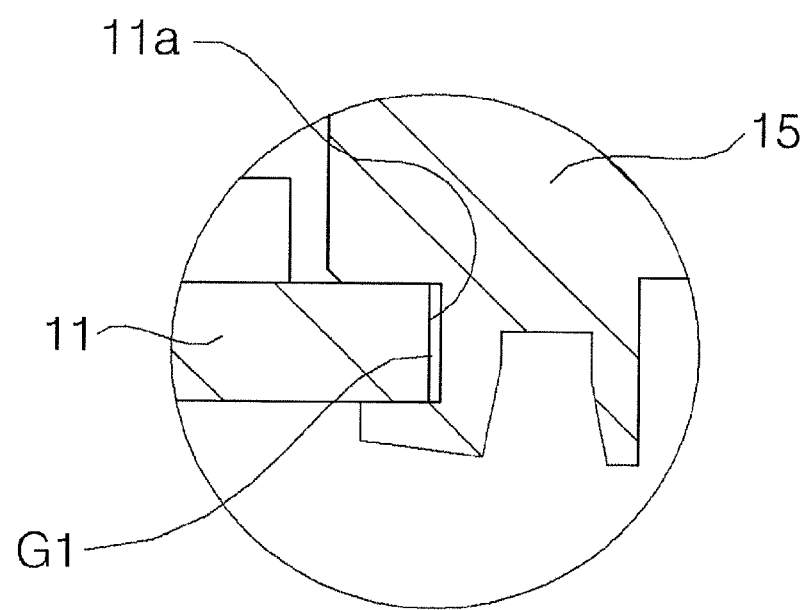

FIG. 1a is a cross-sectional view of essential parts of a spindle motor as an imaginary exemplary embodiment for comparing with the present disclosure, and FIG. 1b is an enlarged view of "A" of FIG. 1a.

Referring to FIGS. 1a and 1b, a base 11 is vertically formed with a bearing housing 15 in which a rotation shaft (not shown) is rotatably installed via a bearing (not shown). The bearing housing 15 is inserted at a lower portion thereof into a coupling hole 11a formed at the base 11 to be caulked and coupled to the base 11.

At this time, a gap (G1) exists between a lower outer periphery of the bearing housing 15 and an inner periphery of the coupling hole 11a to allow the lower portion of the bearing housing 15 to be easily inserted into the coupling hole 11a.

In the imaginary exemplary embodiment of the present invention, an assembly deviation as much as the gap (G1) exists if the bearing housing 15 is coupled to the base 11 due to the gap (G1) that exists between the lower portion of the bearing housing 15 and the coupling hole 11a.

Because of the assembly deviation, the rotation shaft which is a rotational center comes to possess an assembly deviation from the product as much as the gap (G1), such that the rotation shaft deviates from a predetermined position of the product, thereby deteriorating the reliability of the product.

Figure 2:
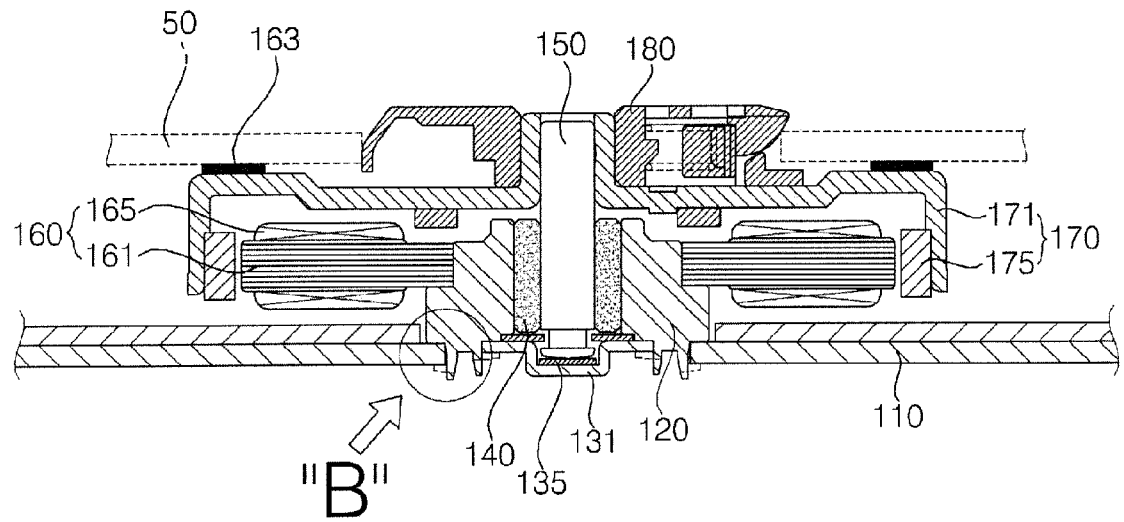
FIG. 2 is a cross-sectional view of a spindle motor according to an exemplary embodiment of the present invention.
Figure 3:
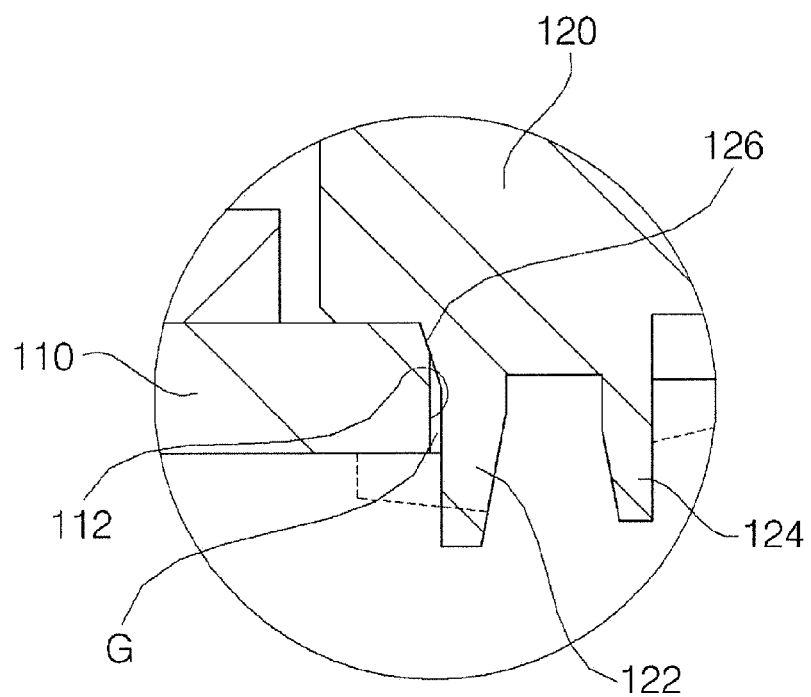
FIG. 3 is an enlarged view of "B" part of FIG. 2.

FIG. 2 is a cross-sectional view of a spindle motor according to an exemplary embodiment of the present invention, and FIG. 3 is an enlarged view of "B" part of FIG. 2.

Referring to FIGS. 2 and 3, a base 110 formed with a coupling hole 112 is provided. Hereinafter, in the description of directions and surfaces of constituent elements including the base 110, a surface and a direction facing a vertical upper side of the base 110 are referred to as 'upper surface and upper side' and a surface and a direction facing a lower side of the base 110 are referred to as 'lower surface and lower side'.

The base 110 is vertically installed with a bearing housing 120. The bearing housing 120 is provided in a cylindrical shape with an open bottom, and a lower end surface of the bearing housing 120 is formed with a first protruder 122 and a second protruder 124 each distanced at a predetermined space.

The first protruder 122 is inserted into a coupling hole 112 and caulked therein, whereby the bearing housing 120 is coupled with the base 110. The second protruder 124 is coupled therein with a thrust stopper 131 closing a lower surface of the bearing housing 120, whereby the thrust stopper 131 is coupled with the second protruder 124 through caulking of the second protruder 124.

The base housing 120 is press-fitted by a bearing 140, and the lower portion of a rotation shaft 150 is installed to be supported and able to rotate in the bearing 140.

The stator 160 has a core 161 coupled to the outer periphery of the bearing housing 120, and a coil 165 wound on the core 161.

A rotor 170 includes a rotor yoke 171 supported on the rotation shaft 150 exposed to the outside of the bearing housing 120, and a magnet 175 coupled to the rotor yoke 171 in opposition to the stator 160.

Accordingly, when a current is applied to the coil 165, the rotor 170 and the rotation shaft 150 are rotated through electromagnetic fields formed between the coil 165 and the magnet 175.

The rotor yoke 171 also serves to function as a turn table on which a disk 50 is mounted. A felt 163 is installed at an upper perimeter of the rotor yoke 171 for preventing the mounted disk 50 from slipping.

A clamp 180 elastically supporting the disk 50 and inhibiting the mounted disk 50 from disengaging upward of the rotor yoke 171 is installed on the outer perimeter of the rotor yoke 151 coupled to the rotation shaft 150, in order to align the center of the mounted disk 50 with the center of the rotation shaft 150.

Unexplained reference numeral 135 defines a thrust plate for preventing the rotation shaft 150 and the thrust stopper 131 from being worn out by supporting the lower portion of the rotation shaft 150.

A gap (G) exists between an outer periphery of the first protruder 122 and an inner periphery of the coupling hole 112 in order to facilitate an easy insertion of the first protruder 122 of the bearing housing 120 into the coupling hole 112. Therefore, after the bearing housing 120 is assembled with the base 110, and the base 110 is assembled with the product, the rotation shaft 150 which is the rotation center is disengaged as much as the gap (G) from a predetermined position of the product.

The spindle motor according to the exemplary embodiment of the present invention, the bearing housing 120 is always coupled to the predetermined area of the base 110 by compensating the gap (G) between the first protruder 122 of the bearing housing 120 and the coupling hole 112. The structural coupling of the bearing housing 120 to the base 110 will be further described with reference to FIGS. 3 and 4, where FIG. 4 is a perspective view of a bearing and a bearing housing illustrated in FIG. 3.

Figure 4:
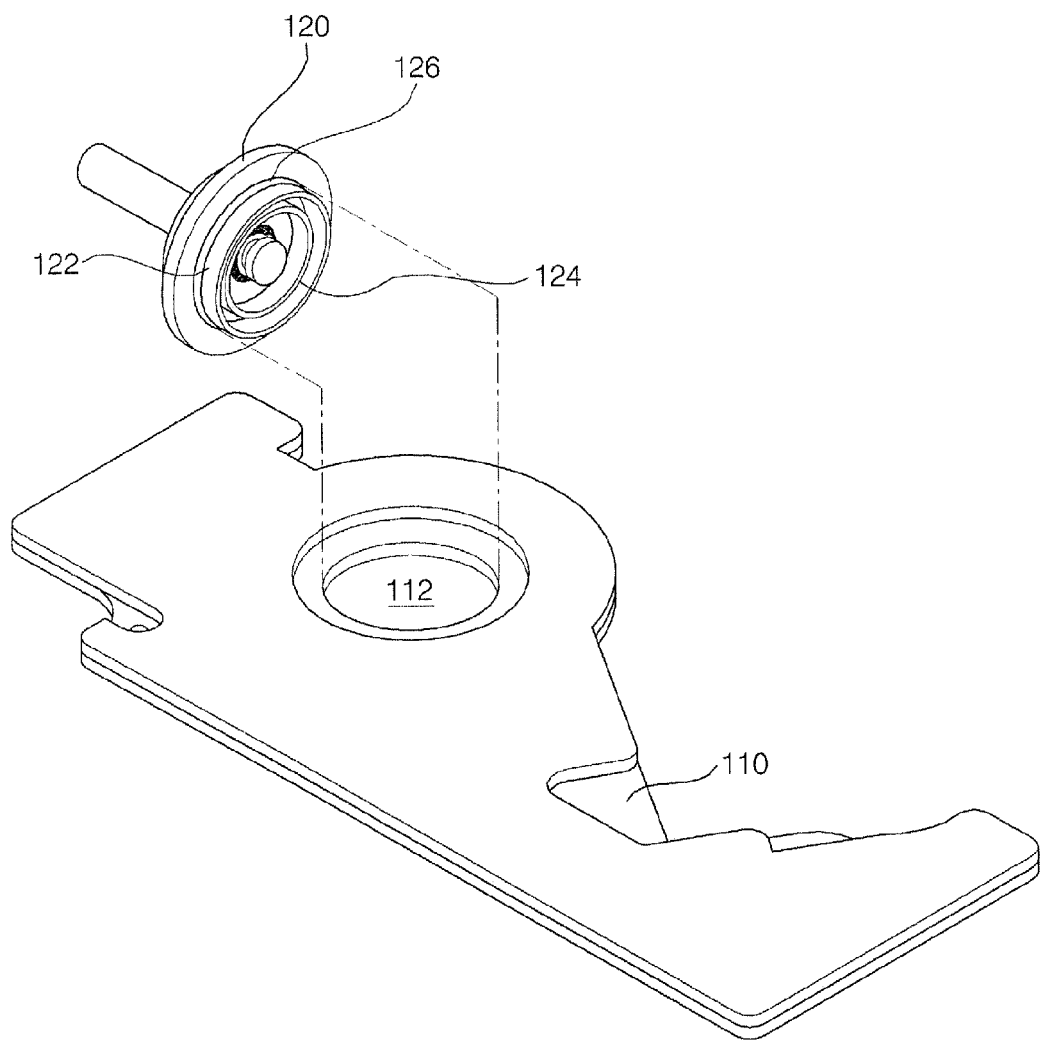
FIG. 4 is a perspective view of a bearing and a bearing housing illustrated in FIG. 3.

Referring to FIGS. 3 and 4, the lower surface of the bearing housing 120 contacts an upper surface of the base 110, and the outer periphery of the first protruder 122 inserted into the coupling hole 112 is formed with a guide portion 126 contacting an inner periphery of the coupling hole 112.

At this time, the guide portion 126 is formed from a substantial center of the first protruder 122 to the lower end surface of the bearing housing 120. Furthermore, the guide portion 126 is slantedly formed toward the lower end surface side of the bearing housing 120 with its radial thickness going thicker. The reason of slanting the guide portion 126 is to easily insert the guide portion 126 into the coupling hole 112.

When the bearing housing 120 is pressed downward to allow an upper side of the first protruder 122 to be inserted into the coupling hole 112 while the lower portion side of the first protruder 122 is inserted into the coupling hole 112, a lower portion side of the guide portion 126 starts to be inserted into the coupling hole 112.

When an upper side of the guide portion 126 is inserted into the coupling hole 112, the outer periphery of the guide portion 126 and the inner periphery of the coupling hole 112 are brought into contact, whereby the bearing housing 120 is not moved on the base 110. Under this circumstance, if the lower portion side of the first protruder 122 is caulked, the bearing housing 120 is coupled to a predetermined area of the base 110, such that when the base 110 is coupled to the product, all the parts of the spindle motor is positioned to a predetermined area of the base.

At this time, an outer diameter of the lower portion side of the guide portion 126 from which the slant starts is made to be greater than an inner diameter of the coupling hole 112 such that the guide portion 126 is press-fitted into the coupling hole 112.

Figure 5:
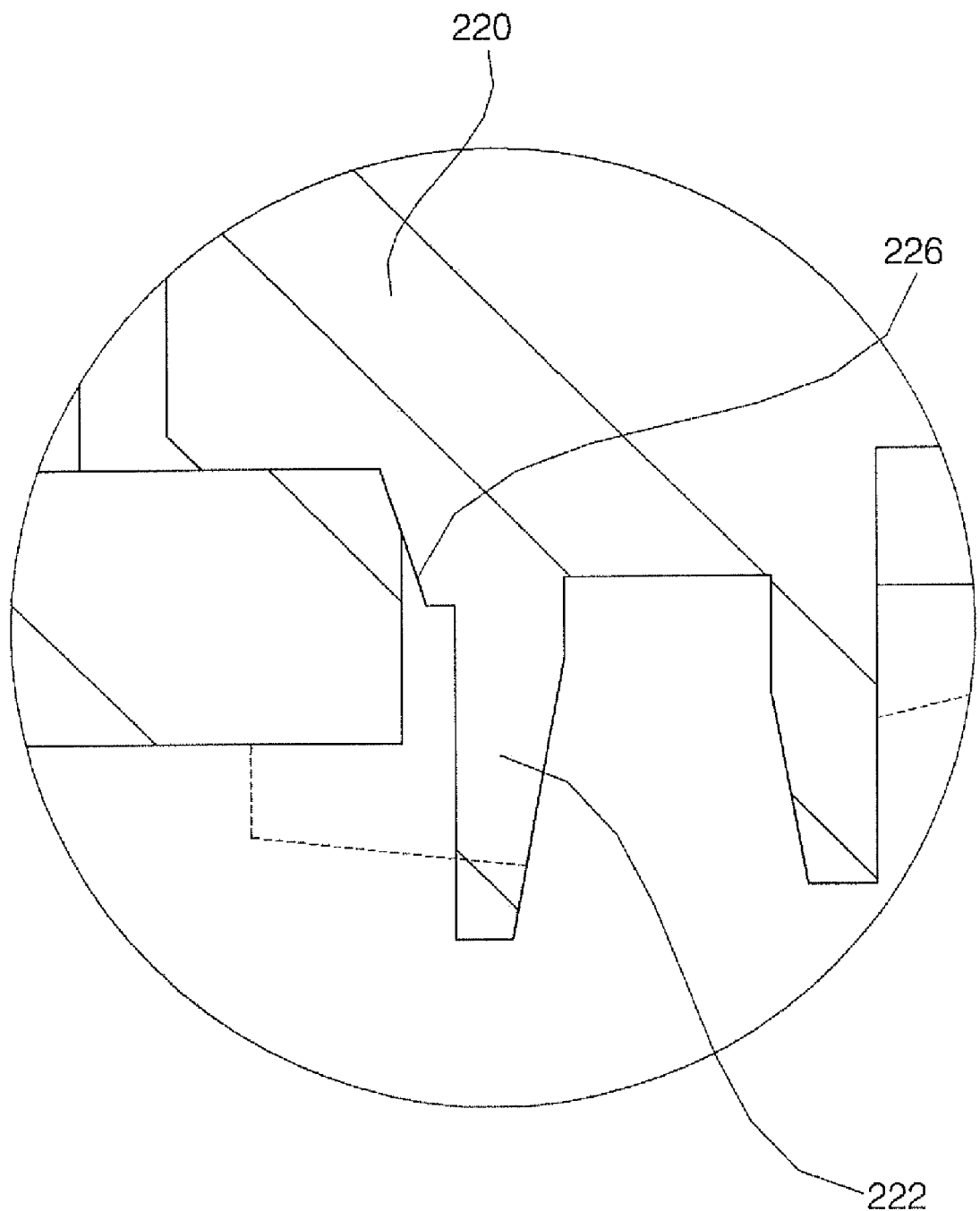
FIG. 5 is an enlarged cross-sectional view of essential parts in a spindle motor according to another exemplary embodiment of the present invention.

FIG. 5 is an enlarged cross-sectional view of essential parts in a spindle motor according to another exemplary embodiment of the present invention, where a guide portion 226 is protruded outside in layers from the outer periphery of a first protruder 222 of a bearing housing 220, such that the outer periphery is axially slanted.

The spindle motor according to the present invention is formed at an outer periphery of a first protruder of a bearing housing having a gap relative to the inner periphery of the coupling hole of a base with a guide portion contacting an inner periphery of a coupling hole. Thereby, the bearing housing is not moved on the base by the guide portion, whereby the bearing housing is always coupled to a predetermined area of the base. Accordingly, when the base assembled with parts is coupled to the product, the parts are always positioned at a predetermined area of the product. Thus, product reliability is improved.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor comprising: a rotation shaft; a bearing rotatably supporting the rotation shaft; a bearing housing where the bearing is installed and the bearing housing formed with a first protruder being protrusively formed on one end of the bearing housing; and a base on which a coupling hole connected to the first protruder is formed, wherein the first protruder includes a guide portion whose region contacting an inner periphery of the coupling hole is slantedly formed.

2. The spindle motor of claim 1, wherein the guide portion is protruded toward an outer periphery of the first protruder to fill a gap between the first protruder and the coupling hole.

3. The spindle motor of claim 2, wherein the guide portion slants with a gradually thickened shape toward an upper surface of the base on which the bearing housing is accommodated.

4. The spindle motor of claim 3, wherein an outer diameter of the guide portion is greater than an inner diameter of the coupling hole at an upper surface position of the base where the bearing housing is accommodated.

5. The spindle motor of claim 4, wherein the guide portion is press-fitted into the coupling hole.

6. The spindle motor of claim 1, further comprising a second protruder provided at an inner side of the first protruder so as to be coupled with a thrust stopper closing a lower surface of the bearing housing through caulking.

7. A spindle motor comprising: a base on which a coupling hole is formed; a bearing housing having a first protruder inserted into the coupling hole through caulking and vertically installed on the base; a bearing fixed inside the bearing housing; a rotation shaft supportively and rotatably installed into the bearing; a rotor coupled to the rotation shaft to simultaneously rotate with the rotation shaft; and a stator disposed around the bearing housing to rotate the rotor, wherein the first protruder is formed at an outer periphery thereof with a guide portion that contacts an inner periphery of the coupling hole.

8. The spindle motor of claim 6, wherein a cross-section of the bearing housing contacts the base, the first protruder is extensively formed from the one cross-section of the bearing housing to be inserted into the coupling hole, and the guide portion is formed from the one cross-section of the bearing housing to a substantial center portion of the first protruder.

9. The spindle motor of claim 8, wherein the guide portion is protrusively formed in layers from the outer periphery of the first protruder.

10. The spindle motor of claim 9, wherein the guide portion slants toward the one cross-section side of the bearing housing with its radial thickness going thickened.

11. The spindle motor of claim 10, wherein an outer diameter of an area where the slant of the guide portion starts is greater than an inner diameter of the coupling hole.

12. The spindle motor of claim 11, wherein the guide portion is press-fitted into the coupling hole.

13. The spindle motor of claim 7, wherein the one cross-section of the bearing housing at an inner side of the first protruder is formed with a second protruder.

* * * * *